United States Patent [19]

Vaughn et al.

[11] 4,047,771
[45] Sept. 13, 1977

[54] BUSHING REMOVAL ADAPTER

[75] Inventors: Kennith E. Vaughn, Creve Coeur; Hugh V. Piper, Peoria, both of Ill.

[73] Assignee: Caterpillar Tractor Co., Peoria, Ill.

[21] Appl. No.: 660,302

[22] Filed: Feb. 23, 1976

[51] Int. Cl.² ............................................. F16C 43/00
[52] U.S. Cl. ................................................ 308/237 R
[58] Field of Search ............. 308/237 R; 29/263, 278, 29/280

[56] References Cited
U.S. PATENT DOCUMENTS 2,614,318 10/1952 McCord .................................. 29/263
3,408,724 11/1968 Hoeijenbos ............................. 29/263

Primary Examiner—Richard A. Bertsch
Attorney, Agent, or Firm—Wegner, Stellman, McCord, Wiles & Wood

[57] ABSTRACT

An adapter for use in the servicing of press-fit bushings comprising a sleeve having an annular radially outwardly directed flange and formed of a plurality of segments. A plug is received within the sleeve to prevent radially inward movement of the segments and a clamp is provided for holding the plug within the sleeve.

5 Claims, 3 Drawing Figures

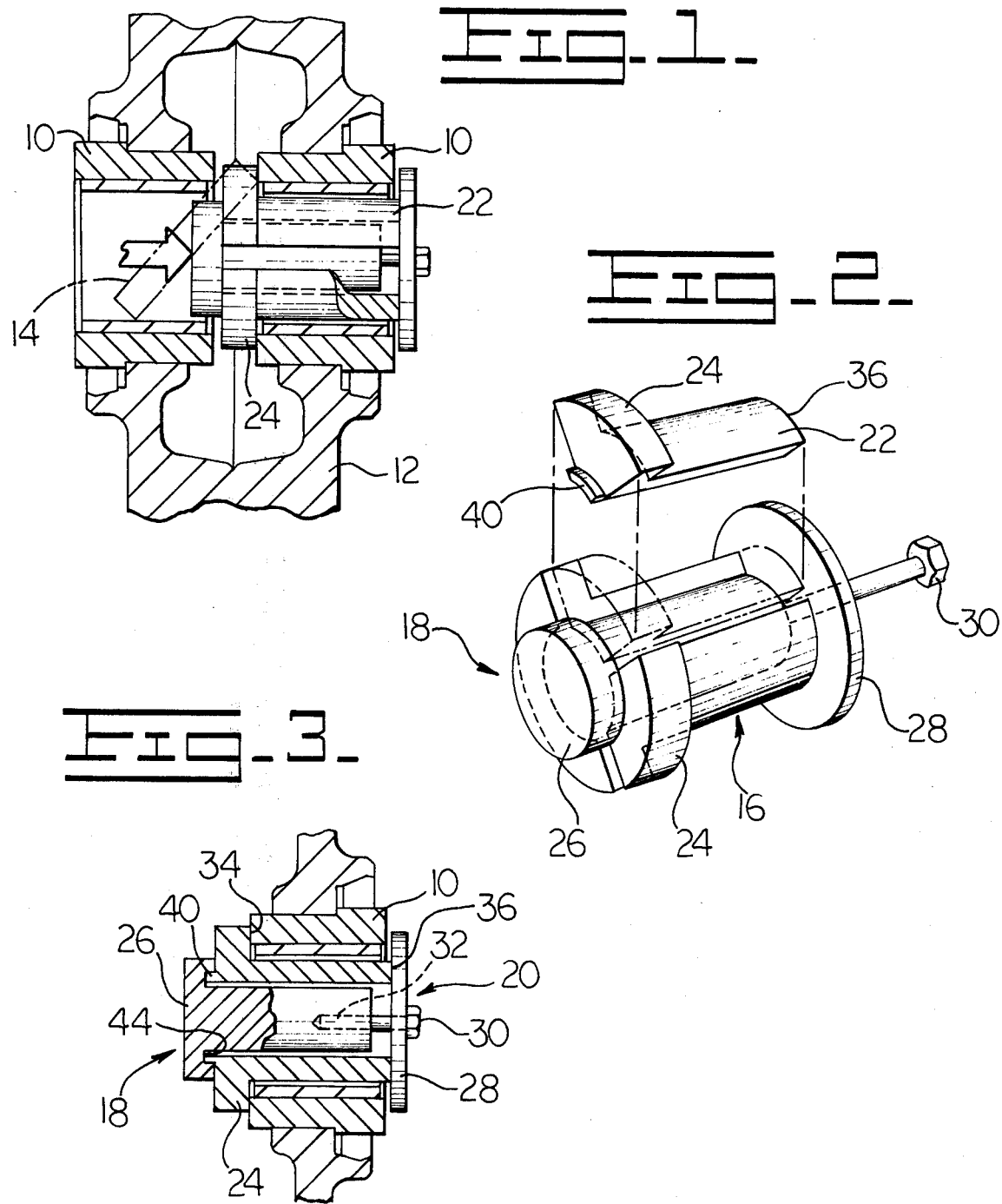

BUSHING REMOVAL ADAPTER

BACKGROUND OF THE INVENTION

This invention relates to the servicing of bushings and, more specifically, to the servicing as, for example, the removal of press-fit bushings and an adapter for use in such servicing.

Manufacturers of vehicles are turning increasingly to the use of support bushings with external or end mounted thrust bearings as, for example, those disclosed in the commonly assigned U.S. Pat. No. 3,744,860 to Casey, issued on July 10, 1973. The use of such bushings permits use of relatively simple shafts as, for example, cylindrical shafts, to be substituted for complex forged support shafts as, for example, those typically employed in track roller assemblies in crawler type tractors.

Frequently, rotary elements employing such bushings that are designed to accommodate high loads employ oversized bearings to carry such loads with the consequence that conventional bushing removal tools cannot always be angled sufficiently within the bore to be inserted to remove the bushing when the servicing thereof is required.

SUMMARY OF THE INVENTION

It is the principal object of the invention to provide a new and improved adapter for use in the servicing of press-fit bushings. More specifically, it is an object of the invention to provide such an adapter which can be assembled on a bushing to be serviced to enable the use of conventional puller tools.

An exemplary embodiment of the invention includes a sleeve having an annular, radially outwardly directed flange. The sleeve is defined by a plurality of segments which may be individually introduced through the opening in a bushing and located such that the flange engages an end of the bushing. The invention includes a plug which is disposed within the sleeve to prevent radially inward movement of the segments once disposed within a bushing and means are provided for holding the plug within the sleeve. Removal force can be applied with a conventional tool to the sleeve.

In a highly preferred embodiment, the holding means includes a disc of sufficient size as to be incapable of passing through the sleeve when the segments are assembled. Preferably, the disc is secured to one end of the plug.

The holding means may further include a retaining plate with a bolt extending therethrough to be threadably received in the plug.

In a highly preferred embodiment, each of the segments includes an axially directed lip and the disc includes at least one recess alignable with the lips to receive the same to assist in maintaining the device in assembled relation, particularly when not being used.

Other objects and advantages will become apparent from the following specification taken in connection with the accompanying drawings.

DESCRIPTION OF THE DRAWINGS

FIG. 1 is a fragmentary sectional view of a wheel having bushings and an adapter made according to the inventon disposed on one of the bushings;

FIG. 2 is a perspective view of an adapter; and

FIG. 3 is a fragmentary sectional view of the adapter.

DESCRIPTION OF THE PREFERRED EMBODIMENT

An exemplary embodiment of an adapter made according to the invention is illustrated in the drawings and is intended for use in connection with the removal of press-fit bushings 10 from rotary elements such as a wheel 12, only a portion of which is shown. In the construction such as that illustrated in FIG. 1, opposed bushings 10 are sufficiently close to each other that conventional removal tools, such as that indicated schematically in dotted lines at 14, cannot be inserted to engage the inner end of the bushing for removal purposes.

In its most basic sense, the adapter is comprised of three components including a sleeve, generally designated 16, a plug 18, receivable within the sleeve 16, and a means 20 for holding the plug 18 within the sleeve 16.

As best seen in FIG. 2, the sleeve 16 is formed of a plurality of segments 22. In the embodiment illustrated, four such segments 22, each having an arcuate extent of 90°, are employed. The sleeve 16 includes a radially outwardly extending flange 24. The outer diameter of the sleeve 22 is just slightly less than the inner diameter of the bushing 10, while the outer diameter of the flange 24 is greater than the inner diameter of the bushing 10. The inner diameter of the sleeve is chosen in connection with the number of segments 22 employed so that the dimension from any point on the flange 24 to any other remote point thereon never exceeds the inner diameter of the bushing 10.

As a consequence, the segments 22 may be individually introduced into the bushing 10 in such a way that the associated flange 24 may be brought into abutment with the end of the bushing 10. As is apparent from FIG. 1, the segments 22 may be inserted into the right-hand bushing 10 from either side and access to the interior of the wheel 12 is thereby easily attained.

Once the segments 22 have been disposed in the previously mentioned relation, the plug 18 is introduced into the center of the sleeve 22. The plug 18 is configured so as to preclude any substantial radial movement of the segments 22 in an inward direction, that is, the plug 22 precludes the sleeve 16 from collapsing and acts as a backing member therefor.

With the plug 18 in place, the means 20 are employed to maintain the components in assembled relation so that a tool can be brought against the assemblage from the left, as viewed in FIG. 1, through the left-hand bushing 10 to drive the right-hand bushing 10 out of its opening in the wheel. The holding means 20 include a disc 26 integral with one end of the plug 18 for engaging the flanges 24 and the segments 22. A retaining plate 28 is located at the opposite end of the segments 22 and by means of a bolt 30 extending therethrough into a threaded bore 32 in the plug 18, the retaining plate 28 may be secured to the assemblage to compress the segments 22 against the disc 26.

Preferably, and as illustrated in FIG. 3, the distance from the axially inward side 34 of the flanges 24 to the end 36 of the segments is slightly greater than the axial length of the bushing so that the plate 28 will engage the segments 22 and clamp the same prior to the bottoming out against the bushing.

If desired, each of the segments 22 may be provided with an axial lip 40 and the disc 26 provided with an annular recess 44 for receipt of the lips 40. Through this construction, the adapter when not in use may be assembled and the segments positively retained in place by reason of the entrance of the lips into the recess.

It is contemplated that in some cases the plug 18 may form part of the press employed in driving the bushings 10 out of the wheel, or omitted entirely. For example, when the wheel 12 is disposed in a horizontal plane to be worked upon by a vertical press, the plug 18 may not be required to orient the segments 22.

We claim:

1. An adapter for use in the servicing of press-fit bushings, comprising:
    a sleeve having an annular, radially outwardly directed flange and comprised of a plurality of separate segments;
    a plug received within said sleeve to prevent radially inward movement of said segments; and
    means for holding said plug within said sleeve.

2. The adapter of claim 1 wherein said holding means includes a disc of sufficient size as to be incapable of passing through said sleeve when said segments are assembled.

3. The adapter of claim 2 wherein said segments, adjacent said flange, each include an axially directed lip and said disc includes at least one recess alignable with said lips to receive the same.

4. The adapter of claim 2 wherein said disc is secured to said plug and wherein said holding means further includes a retainer plate and a bolt extending through said retainer plate and threadably received in said plug.

5. An adapter for use in the servicing of press-fit bushings, comprising: a sleeve having an outer diameter slightly less than the inner diameter of the bushing to be serviced and an annular, radially outwardly directed flange of a diameter greater than the inner diameter of the bushing to be serviced, said sleeve being comprised of a plurality of separate arcuate segments; a plug received within said sleeve for backing said segments to prevent radially inward movement thereof, said plug having a disc at one end having an outer diameter less than the inner diameter of the bushing to be serviced and greater than the interior dimension of the sleeve; and clamping means for holding said plug within said sleeve.

* * * * *